(12) United States Patent
Li et al.

(10) Patent No.: US 12,228,408 B2
(45) Date of Patent: Feb. 18, 2025

(54) SENSOR DATA FUSION SYSTEM WITH NOISE REDUCTION AND FAULT PROTECTION

(71) Applicant: The Boeing Company, Chicago, IL (US)

(72) Inventors: Rongsheng Li, Corona, CA (US); Chang J. Yoo, Long Beach, CA (US); Tung-Ching Tsao, Torrance, CA (US); Andrey Tolstov, Anaheim, CA (US); Cody L. Gruebele, Corona, CA (US)

(73) Assignee: The Boeing Company, Arlington, VA (US)

( * ) Notice: Subject to any disclaimer, the term of this patent is extended or adjusted under 35 U.S.C. 154(b) by 382 days.

(21) Appl. No.: 17/477,246

(22) Filed: Sep. 16, 2021

(65) Prior Publication Data

US 2022/0147045 A1    May 12, 2022

Related U.S. Application Data

(60) Provisional application No. 63/110,525, filed on Nov. 6, 2020.

(51) Int. Cl.
    G01C 21/16    (2006.01)
(52) U.S. Cl.
    CPC ..................... G01C 21/16 (2013.01)
(58) Field of Classification Search
    CPC ....................................................... G01C 21/16
    See application file for complete search history.

(56) References Cited

U.S. PATENT DOCUMENTS

| 6,674,398 B2 | 1/2004 | Murphy |
| 8,494,225 B2 * | 7/2013 | Center ................. G06T 7/269 |
| | | 348/113 |
| 8,762,091 B1 * | 6/2014 | Foxlin ................. G01P 15/00 |
| | | 702/87 |

(Continued)

FOREIGN PATENT DOCUMENTS

| EP | 2629053 A2 | 8/2013 |
| EP | 2685212 A2 | 1/2014 |
| EP | 2685212 A3 | 1/2016 |

OTHER PUBLICATIONS

Ask Google—Searching in Google (Year: 2024).*

(Continued)

*Primary Examiner* — Mohamed Charioui
*Assistant Examiner* — Lynda Dinh
(74) *Attorney, Agent, or Firm* — Harrity & Harrity, LLP (57) ABSTRACT

Sensor data fusion systems that provide noise reduction and fault protection. The sensor data fusion system fuses data acquired by respective accelerometers having different attributes. For example, one accelerometer has low noise and high bias, while another accelerometer has high noise and low bias when measuring specific force. The high-noise, low-bias accelerometer may be a gravimeter. Gravimeters and traditional accelerometers measure the same physical variable, i.e., specific force. By combining an expensive gravimeter and low-cost accelerometers, a synthetic sensor having both low noise and low bias may be achieved. Such synthetic sensors may be utilized in a gravity anomaly-referenced navigation system to achieve improved navigation performance.

21 Claims, 4 Drawing Sheets

(56) References Cited

U.S. PATENT DOCUMENTS

| | | | |
|---|---|---|---|
| 9,304,184 B1 | 4/2016 | Dragonov et al. | |
| 9,316,664 B2* | 4/2016 | Buck | G01P 15/00 |
| 9,846,240 B2 | 12/2017 | Li et al. | |
| 10,694,148 B1 | 6/2020 | Li et al. | |
| 10,993,121 B1 | 4/2021 | Li et al. | |
| 2009/0223276 A1* | 9/2009 | Rudolf | G01C 19/5726 |
| | | | 73/1.37 |
| 2011/0187546 A1* | 8/2011 | Liberman | G08B 21/00 |
| | | | 340/669 |
| 2016/0047675 A1* | 2/2016 | Tanenhaus | G01C 25/005 |
| | | | 702/104 |
| 2016/0214742 A1* | 7/2016 | Carroll | G01C 21/1656 |
| 2018/0120127 A1 | 5/2018 | Kotwal et al. | |
| 2020/0025942 A1 | 1/2020 | Kassas et al. | |
| 2020/0103436 A1* | 4/2020 | Hanson | G01P 21/00 |

OTHER PUBLICATIONS

Analog Devices, Year: 2010.*
Analog Devices—ADXL001 and ADXL003. Year 2010.*
Extended European Search Report (EESR) issued on Mar. 21, 2022, in European Patent Application No. 21205192.4 (European counterpart of the instant U.S. patent application).
Cheiney et al., "Demonstration of a Robust Hybrid Classical/Quantum Accelerometer", 2019, IEEE Intl. Symp. on Inertial Sensors and Systems, Apr. 1, 2019, pp. 1-4.

* cited by examiner

SENSOR DATA FUSION SYSTEM WITH NOISE REDUCTION AND FAULT PROTECTION

RELATED PATENT APPLICATION

This application claims the benefit, under Title 35, United States Code, Section 119(e), of U.S. Provisional Application No. 63/110,525 filed on Nov. 6, 2020.

BACKGROUND

The present disclosure generally relates to sensors used in geo-spatial positioning and navigation systems and, in particular, relates to synthetic sensors configured to produce fused sensory data representing measurements of the same physical variable (e.g., acceleration due to gravity).

A gravity anomaly-referenced navigation system provides navigation assistance by referencing a position of a platform with respect to a gravity anomaly map/database. Typical navigation systems determine a navigation solution based on measurements from an inertial measurement unit. However, inertial measurement units produce errors that increase over time due to integrations within inertial navigation algorithms. A gravity anomaly-referenced navigation system is configured to blend the navigational solution, which is based on measurements from the inertial measurement unit, with gravity anomaly measurements. The gravity anomaly measurements have generally been obtained using a gravimeter, which is an instrument used to measure "specific force". Specific force is defined as the non-gravitational force per unit mass. Specific force (also called "g-force") is measured in meters per second squared (m/sec$^2$), which are the units of acceleration. Thus, specific force is a type of acceleration.

Global positioning systems (GPS) and global navigation satellite systems (GNSS) are more widely used than are gravity anomaly-referenced navigation systems. However, GPS and GNSS signals are more susceptible to external interference as compared to gravity anomaly-referenced navigation systems. Specifically, GPS and other GNSS signals are low in power, thereby making them susceptible to disruption by even very low power interferences. For example, GPS denial may be caused by interference referred to as "jamming". In contrast, gravity anomaly-referenced navigation systems are resistant to jamming. As a result, gravity anomaly-referenced navigation systems may be used as an alternative or a supplemental solution when GPS and GNSS systems are unavailable (among many other "complementary" or "alternative" positioning, navigation and tracking (PNT) approaches such as vision-based navigation, celestial navigation, terrain-referenced navigation, signal-of-opportunity-based PNT, etc.)

In one specific gravity anomaly-referenced navigation system, the gravimeter had unacceptable noise levels (for example, 25 micro-g/sqrt(Hz)) but acceptable bias levels (for example, 1 micro-g). (The unit g is equal to 9.80665 m/sec$^2$.)

SUMMARY

The subject matter disclosed in some detail below is directed to sensor data fusion systems that provide noise reduction and fault protection. In accordance with some embodiments, the sensor data fusion system fuses data acquired by respective accelerometers having different attributes. In one embodiment, one accelerometer has low noise and high bias, while another accelerometer has high noise and low bias when measuring specific force. In one proposed implementation, the high-noise, low-bias accelerometer is a gravimeter.

Gravimeters and traditional accelerometers measure the same physical variable. Traditional accelerometers typically have very low noise (known as velocity random walk; for example, 1 micro-g/sqrt(Hz)), but have higher bias repeatability/stability levels (for example, 30 micro-g) than corresponding levels for a gravimeter. By combining an expensive gravimeter and low-cost accelerometers, a synthetic sensor system (hereinafter "sensor data fusion system") having both low noise and low bias may be achieved.

The subject matter disclosed in some detail below is further directed to a gravity anomaly-referenced navigation system that uses such a sensor data fusion system to achieve improved navigation performance. More specifically, measurement data from a noisy gravimeter and a less noisy accelerometer is mixed to achieve two benefits: (1) reduced noise for performance improvements; and (2) fault protection.

As used herein, the term "sensor data fusion" is the combining of sensor data such that the resulting information has less uncertainty than would be the case if the sensors were used individually. The term "uncertainty reduction" in this case can mean more accurate, more complete, or more dependable. As used herein, the terms "high" and "low" are relative, not absolute terms. For example, high noise is greater than low noise and high bias is greater than low bias.

Although various embodiments of a sensor data fusion system that measures specific force exerted on a moving platform in aid of navigation will be described in some detail below, one or more of those embodiments may be characterized by one or more of the following aspects.

One aspect of the subject matter disclosed in detail below is a sensor data fusion system comprising: a first accelerometer having low noise and high bias; a second accelerometer having high noise and low bias (e.g., a gravimeter); a first subtracter connected to receive signals from the first and second accelerometers and configured to output a first difference signal representing a difference between the signals from the first and second accelerometers; a first filter connected to receive the first difference signal output by the first subtracter and configured to output a signal representing an estimated relative bias of the first and second accelerometers; and a second subtracter connected to receive the signal from the first accelerometer and the signal from the first filter and configured to output a second difference signal representing a difference between the signals from the first accelerometer and first filter. The second difference signal has low noise and low bias.

In accordance with some embodiments, the sensor data fusion system described in the immediately preceding paragraph further comprises a fault detector connected to receive the first difference signal and configured to output a fault true signal if the first difference signal persistently exceeds a specified difference threshold.

In accordance with other embodiments, the sensor data fusion system further comprises: a third accelerometer having low noise and high bias; a third subtracter connected to receive signals from the second and third accelerometers and configured to output a third difference signal representing a difference between the signals from the second and third accelerometers; a second filter connected to receive the third difference signal output by the third subtracter and configured to output a signal representing an estimated relative bias of the second and third accelerometers; and a fourth subtracter connected to receive the signal from the third accelerometer and the signal from the second filter and configured to output a fourth difference signal representing a difference between the signals from the third accelerometer and second filter. In addition, the sensor data fusion system may include: a first fault detector connected to receive the first difference signal and configured to output a fault true signal if the first difference signal persistently exceeds a specified difference threshold and a fault false signal otherwise; a second fault detector connected to receive the third difference signal and configured to output a fault true signal if the third difference signal persistently exceeds the specified difference threshold and a fault false signal otherwise; and a processing device connected to the first and second fault detectors and the third and fourth subtracters. The processing device is configured to: output the first difference signal if the first fault detector outputs a fault false signal while the second fault detector outputs a fault true signal; and output the second difference signal if the first fault detector outputs a fault true signal while the second fault detector outputs a fault false signal. In one proposed implementation, the processing device is further configured to output a weighted sum of the first and second difference signals if the first and second fault detectors output respective fault false signals. In addition, the processing device may be configured to output a weighted sum of the signals output by the first and third accelerometers with previously estimated bias if the first and second fault detectors output respective fault true signals.

Another aspect of the subject matter disclosed in detail below is a method for fusing sensor data comprising: using a first accelerometer having low noise and high bias to output a first measurement signal representing a first measurement of a specific force in a vertical direction in a frame of reference of a platform; using a second accelerometer having high noise and low bias to output a second measurement signal representing a second measurement of the specific force in the vertical direction in the frame of reference of the platform; generating a first difference signal representing a difference between the first and second measurement signals; filtering the first difference signal to produce a bias estimate signal representing an estimated relative bias of the first and second accelerometers; and generating a second difference signal representing a difference between the first measurement signal and the bias estimate signal. The method may further comprise using the first difference signal in a navigation process if the first difference signal does not persistently exceed a specified difference threshold.

A further aspect of the subject matter disclosed in detail below is a system for navigating a platform comprising: an inertial navigation system configured to generate a navigation solution and comprising an accelerometer having low noise and high bias; a gravimeter having high noise and low bias; a guidance and control system communicatively coupled to the inertial navigation system and configured to control the platform in accordance with the navigation solution; a sensor data fusion module configured to generate a bias estimate signal representing a relative bias estimate from outputs of the accelerometer and gravimeter and then generate a signal that represents a corrected output of the accelerometer derived by subtracting the bias estimate signal from the output of the accelerometer; a time-matching buffer communicatively coupled to the inertial navigation system and configured to store data representing position, velocity and attitude of the platform with a time-tag; a gravity anomaly database stored in a non-transitory tangible computer-readable storage medium; a gravimeter output predictor communicatively coupled to receive time-tagged position, velocity, and attitude of the platform from the time-matching buffer and retrieve gravity anomaly data from the gravity anomaly database and configured to output a prediction signal representing a prediction of the output of the gravimeter; a residual and matrix calculation module communicatively coupled to receive the prediction signal and the corrected output of the accelerometer and configured to generate a residual, an H-matrix, and an R-matrix based on a difference between the prediction signal and the corrected output of the accelerometer; and a Kalman filter configured to generate a position correction based on the difference between the prediction signal and the corrected output of the accelerometer and then send the position correction to the inertial navigation system.

Other aspects of sensor data fusion systems that measure specific force exerted on a moving platform in aid of navigation are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Illustrative embodiments of a sensor data fusion system that measures specific force exerted on a moving platform in aid of navigation are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
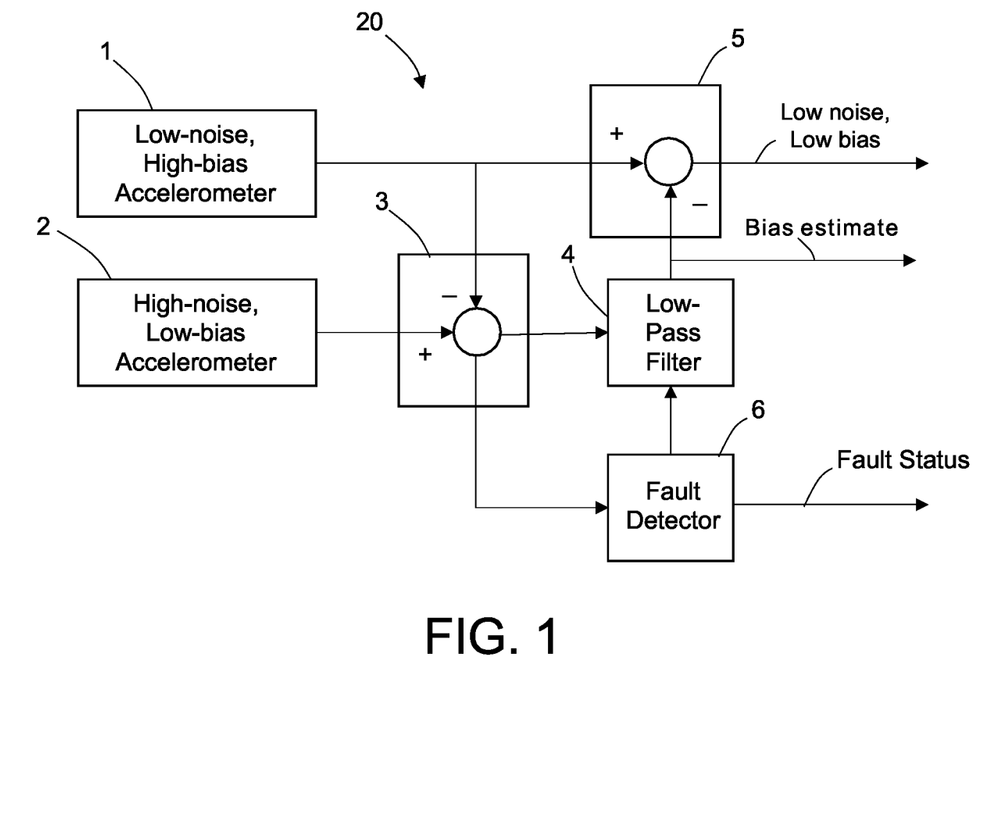
FIG. 1 is a block diagram identifying components of a sensor data fusion system in accordance with one embodiment that includes a low-noise, high-bias accelerometer, a high-noise, low-bias accelerometer (e.g., a gravimeter), and a fault detector.

FIG. 1 is a block diagram identifying components of a sensor data fusion system 20 in accordance with one embodiment that includes a low-noise, high-bias accelerometer 1, a high-noise, low-bias accelerometer 2 (e.g., a gravimeter), and a fault detector 6. The low-noise, high-bias accelerometer 1 is used to output a first measurement signal representing a first measurement of a specific force in a vertical direction in a frame of reference of a platform (not shown in FIG. 1). The high-noise, low-bias accelerometer 2 is used to output a second measurement signal representing a second measurement of the specific force in the vertical direction in the frame of reference of the platform. The output of low-noise, high-bias accelerometer 1 is the primary output. The high-noise, low-bias accelerometer 2 is used to estimate the bias of the low-noise, high-bias accelerometer 1. (The low-noise, high-bias accelerometer 1 and high-noise, low-bias accelerometer 2 will be collectively referred to herein as "accelerometers 1 and 2").

The sensor data fusion system 20 depicted in FIG. 1 further includes a first subtracter 3 connected to receive signals from low-noise, high-bias accelerometer 1 and configured to output a first difference signal representing a difference between the signals output by accelerometers 1 and 2. In addition, the sensor data fusion system 20 includes a filter 4 (e.g., a low-pass filter) connected to receive the first difference signal output by the first subtracter 3 and configured to output a bias estimate signal representing an estimated relative bias of accelerometers 1 and 2. The sensor data fusion system 20 further includes a second subtracter 5 connected to receive the signal from low-noise, high-bias accelerometer 1 and the bias estimate signal from filter 4 and configured to output a second difference signal representing a difference between the signal from low-noise, high-bias accelerometer 1 and the bias estimate signal. The second subtracter 5 corrects the output of low-noise, high-bias accelerometer 1 by the estimated relative bias between the accelerometers 1 and 2. The second difference signal has low noise and low bias.

In addition, a simple fault protection can also be performed if any of one the sensors outputs a faulty sample. The sensor data fusion system 20 depicted in FIG. 1 further includes a fault detector 6 that is connected to receive the first difference signal from the first subtracter 3. The fault detector 6 is configured to output a fault true signal if the first difference signal persistently exceeds a specified difference threshold and output a fault false signal otherwise. In the latter case, the first difference signal is approved for use by the navigation system (not shown in FIG. 1).

Figure 2:
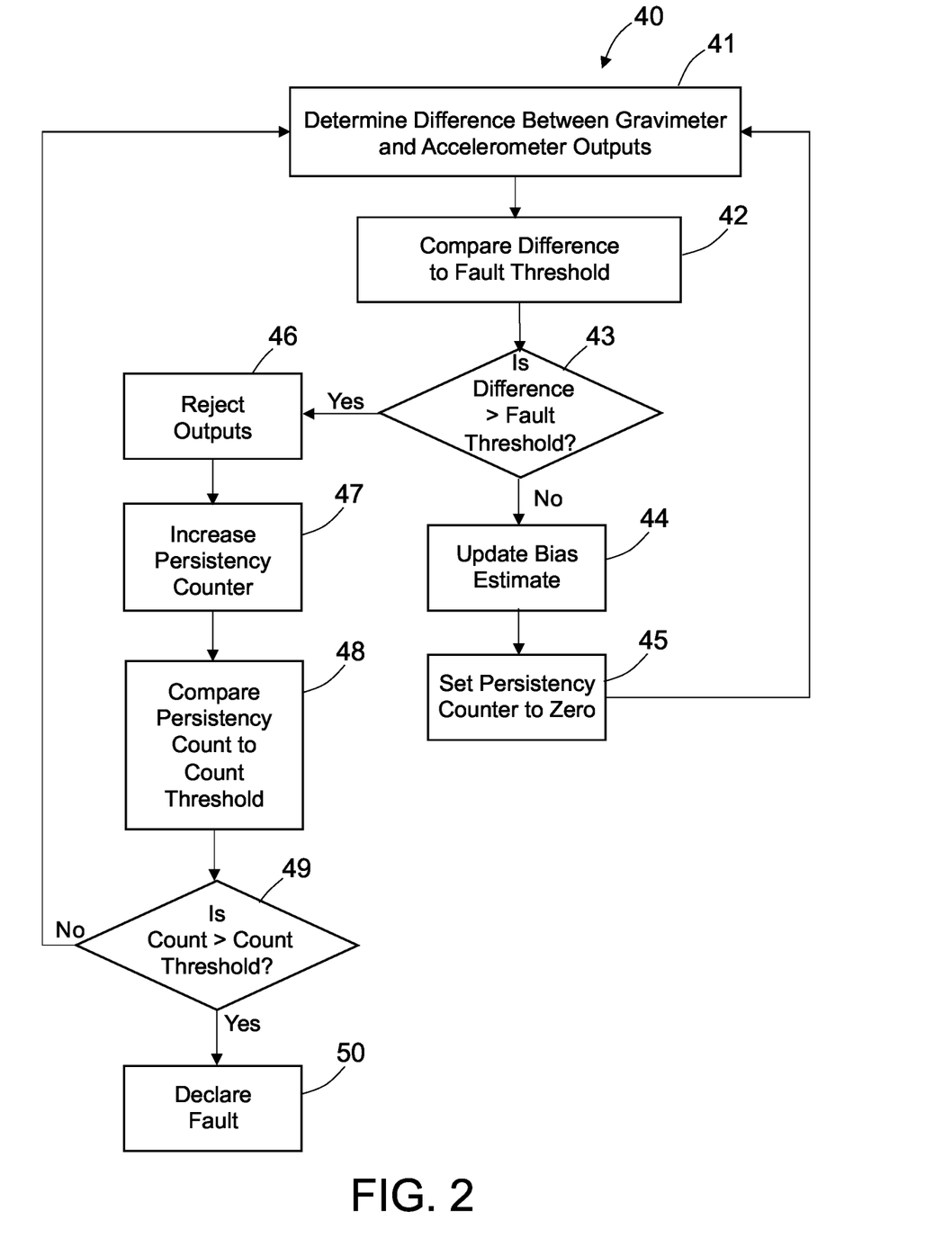
FIG. 2 is a flowchart identifying steps of a method for detecting a fault during operation of the sensor data fusion system depicted in FIG. 1.

FIG. 2 is a flowchart identifying steps of a method 40 for detecting a fault during operation of the sensor data fusion system 20 depicted in FIG. 1. As previously described, the first subtracter 3 determines the difference between the outputs of the accelerometers (step 41). The fault detector 6 then compares that difference to a specified difference threshold that is indicative of the existence of a fault (step 42). A determination is then made whether the difference between the outputs of the accelerometers is greater than the specified difference threshold or not (step 43). On the one hand, if a determination is made in step 43 that the difference in accelerometer outputs is not greater than the specified difference threshold, the bias estimate is updated (step 44). In that event, a persistency counter is set to zero (step 45) and the process returns to step 41. On the other hand, if a determination is made in step 43 that the difference in accelerometer outputs is greater than the specified difference threshold, the bias estimate is not updated. Instead the accelerometer outputs are rejected (step 46). Then the count in the persistency counter is increased by the number one (step 47). The fault detector 6 then compares the persistency count to a specified count threshold (step 48). A determination is then made whether the persistency count is greater than the specified count threshold or not (step 49). On the one hand, if a determination is made in step 49 that the persistency count is not greater than the specified count threshold, the process returns to step 41. On the other hand, if a determination is made in step 49 that the persistency count is greater than the specified count threshold, then a fault is declared (step 50).

The result of the sensor data fusion methodology depicted in FIGS. 1 and 2 is that the bias of the "synthetic sensor" is approximately the same as the bias level of the high-noise low-bias accelerometer 2 (which may be a gravimeter). The noise of the "synthetic sensor" is approximately the same as the noise level of the low-noise, high-bias accelerometer 1.

The high-bias low-noise accelerometer 1 may be a traditional navigation-grade accelerometer whose output can be modeled as $$a_{HL}=a+b_H+v_L$$

where a is the true specific force, $a_{HL}$ is the measured specific force, $b_H$ is the bias, and $v_L$ is the noise.

The low-bias high-noise accelerometer 2 may be a gravimeter whose output can be modeled as $$a_{LH}=a+b_L+v_H$$

where $a_{LH}$ is the measured specific force, $b_L$ is the bias, and $v_H$ is the noise.

Subtracter 3 is a difference circuit where the above two outputs $a_{HL}$ and $a_{LH}$ are differenced, which can be modeled as $$\delta a=a_{HL}-a_{LH}=(b_H-b_L)+(v_L+v_H)$$

The filter 4 may be a low-pass filter which will retain the slow-changing value of $(b_H-b_L)$ and filter out most of the noise. After low-pass filtering, the filtered output can be modeled as $$\delta a_F=\text{LPF}(\delta a)\approx(b_H-b_L)$$

Subtracter 5 uses the "estimated relative bias" to correct the output $a_{HL}$ from high-bias low-noise accelerometer 1 and yield an output which has small bias and small noise, which can be modeled as $$a_{LH}=a_{HL}-\delta a_F\approx a+b_H+v_L-(b_H-b_L)=a+b_L+v_L$$

The fault detector 6 is configured to perform fault detection by checking relative difference δa against upper and lower bounds. If the value exceeds either bound, then a persistent counter is increased by the number one and also the filter 4 will be instructed to not use the sample as a "containment measure". If the persistency count exceeds a specified count threshold, a fault is detected and declared.

For the purpose of simplified description later, the term "fused solution" is defined as follows:

[fused_output, bias_est, fault]=fused_solution(accelerometer, gravimeter)

In accordance with one alternative embodiment, the filter 4 may be a Kalman filter instead of a low-pass filter. In accordance with other embodiments, complementary filtering can also be used. For example, the output of the low-noise, high-bias accelerometer 1 may be filtered by a high-pass filter, while the output of the high-noise, low-bias accelerometer 2 is filtered by a low-pass filter. The combination provides optimized performance.

Figure 3:
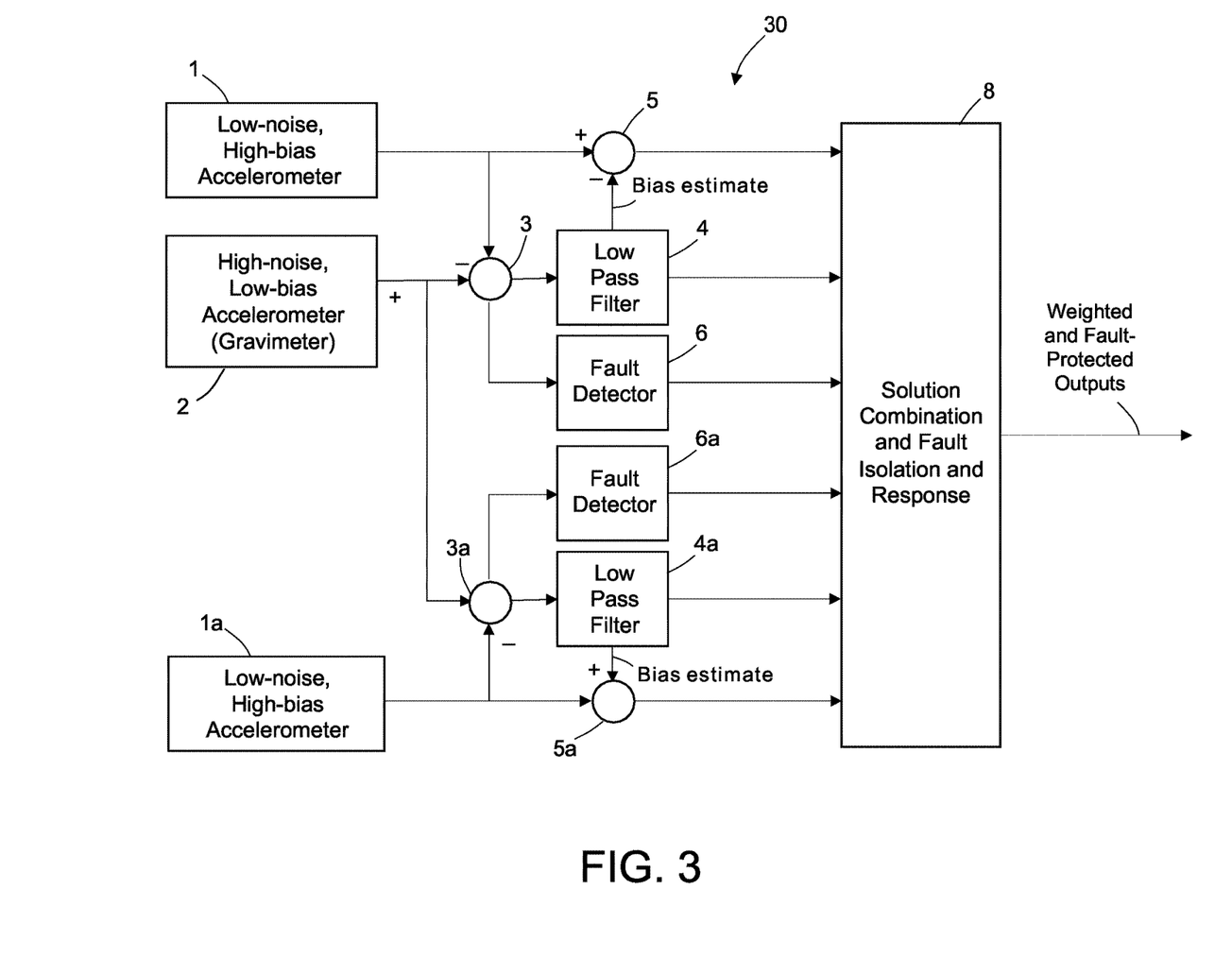
FIG. 3 is a block diagram identifying components of a sensor data fusion system that includes two low-noise, high-bias accelerometers, one high-noise, low-bias accelerometer (e.g., a gravimeter), two fault detectors, and a processing device (or computing device) in accordance with an alternative embodiment.

FIG. 3 is a block diagram identifying components of a sensor data fusion system 30 that includes two low-noise, high-bias accelerometers 1 and 1a, one high-noise, low-bias accelerometer 2 (e.g., a gravimeter), two filters 4 and 4a, two fault detectors 6 and 6a, and a processing device 8 (or computing device) in accordance with an alternative embodiment. Two low-noise, high-bias accelerometers 1 and 1a are included to allow voting to not only detect faults but also isolate faults, and to also allow further reduction of noise.

The low-noise, high-bias accelerometer 1 is used to output a first measurement signal representing a first measurement of a specific force in a vertical direction in a frame of reference of a platform (not shown in FIG. 3). The high-noise, low-bias accelerometer 2 (e.g., a gravimeter) is used to output a second measurement signal representing a second measurement of the specific force in the vertical direction in the frame of reference of the platform. The low-noise, high-bias accelerometer 1a is used to output a third measurement signal representing a third measurement of the specific force in the vertical direction in the frame of reference of the platform.

The sensor data fusion system 30 depicted in FIG. 3 further includes a first subtracter 3 connected to receive signals from low-noise, high-bias accelerometer 1. The first subtracter 3 is configured to output a first difference signal representing a difference between the signals output by accelerometers 1 and 2. Filter 4 (e.g., a low-pass filter) is connected to receive the first difference signal output by the first subtracter 3. The filter 4 is configured to output a bias estimate signal representing an estimated relative bias of accelerometers 1 and 2. The sensor data fusion system 30 further includes a second subtracter 5 connected to receive the signal from low-noise, high-bias accelerometer 1 and the bias estimate signal from filter 4. The second subtracter 5 is configured to output a second difference signal representing a difference between the signal from low-noise, high-bias accelerometer 1 and the bias estimate signal from filter 4. The second subtracter 5 corrects the output of low-noise, high-bias accelerometer 1 by the estimated relative bias between the accelerometers 1 and 2. The second difference signal has low noise and low bias.

In addition, the sensor data fusion system 30 includes a third subtracter 3a connected to receive signals from low-noise, high-bias accelerometer 1a. The third subtracter 3a is configured to output a third difference signal representing a difference between the signals output by accelerometers 1a and 2. Filter 4a (e.g., a low-pass filter) is connected to receive the third difference signal output by the third subtracter 3a. Filter 4a is configured to output a bias estimate signal representing an estimated relative bias of accelerometers 1a and 2. The sensor data fusion system 30 further includes a fourth subtracter 5a connected to receive the signal from low-noise, high-bias accelerometer 1a and the bias estimate signal from filter 4a. The fourth subtracter 5a is configured to output a fourth difference signal representing a difference between the signal from low-noise, high-bias accelerometer 1a and the bias estimate signal from filter 4a. The fourth subtracter 5a corrects the output of low-noise, high-bias accelerometer 1a by the estimated relative bias between the accelerometers 1a and 2. The fourth difference signal has low noise and low bias.

In addition, a fault protection algorithm is performed to determine an appropriate response if any of one the sensors outputs a faulty sample. The sensor data fusion system 20 depicted in FIG. 3 further includes a fault detector 6 that is connected to receive the first difference signal from the first subtracter 3 and a fault detector 6a that is connected to receive the third difference signal from the third subtracter 3a. The fault detector 6 is configured to output a fault true signal if the first difference signal persistently exceeds a specified difference threshold and output a fault false signal otherwise. Similarly, the fault detector 6a is configured to output a fault true signal if the third difference signal persistently exceeds the specified difference threshold and output a fault false signal otherwise. (As used herein, the term "fault false signal" refers to a signal representing a "fault not declared" state; conversely, the term "fault true signal" refers to a signal representing a "fault declared" state.)

In accordance with one proposed implementation, the processing device 8 is configured to execute an algorithm that selects any one of three available solutions depending on the fault status of the accelerometers as detected by the fault detectors 6 and 6a. Using the symbols described earlier, Solutions 1, 2, and 3 are defined as follows:

$$[\text{solution}_1, \text{bias\_est}_1, \text{fault}_1] = \text{fused\_solution}(\text{accelerometer}_1, \text{gravimeter})$$

$$[\text{solution}_2, \text{bias\_est}_2, \text{fault}_2] = \text{fused\_solution}(\text{accelerometer}_2, \text{gravimeter})$$

$$\text{solution}_3 = (w)\text{solution}_1 + (1-w)\text{solution}_2$$

where $w$ is a weighting factor having a value in a range between 0 and 1.

The solution selection algorithm, when executed by the processing device 8, selects one of the following responses depending on fault conditions:

(1) The processing device 8 outputs a weighted sum of the first and second difference signals (Solution 3), for use by the navigation system, if fault detectors 6 and 6a output respective fault false signals.

(2) The processing device 8 outputs the fourth difference signal (Solution 2), for use by the navigation system, if fault detector 6 outputs a fault true signal while fault detector 6a outputs a fault false signal.

(3) The processing device 8 outputs the second difference signal (Solution 1), for use by the navigation system, if fault detector 6 outputs a fault false signal while fault detector 6a outputs a fault true signal.

(4) The processing device 8 outputs a weighted sum of the signals output by the first and third accelerometers with previously estimated bias, for use by the navigation system, if fault detectors 6 and 6a output respective fault true signals. This fault state indicates that the high-noise, low-bias accelerometer 2 has a fault, so the fault detectors 6 and 6a are further configured to disable input from high-noise, low-bias accelerometer 2 for Solutions 1 and 2 and use Solution 3 as the output. Solutions 1, 2, and 3 can be used with previously estimated bias with no update from the high-noise, low-bias accelerometer 2.

Figure 4:
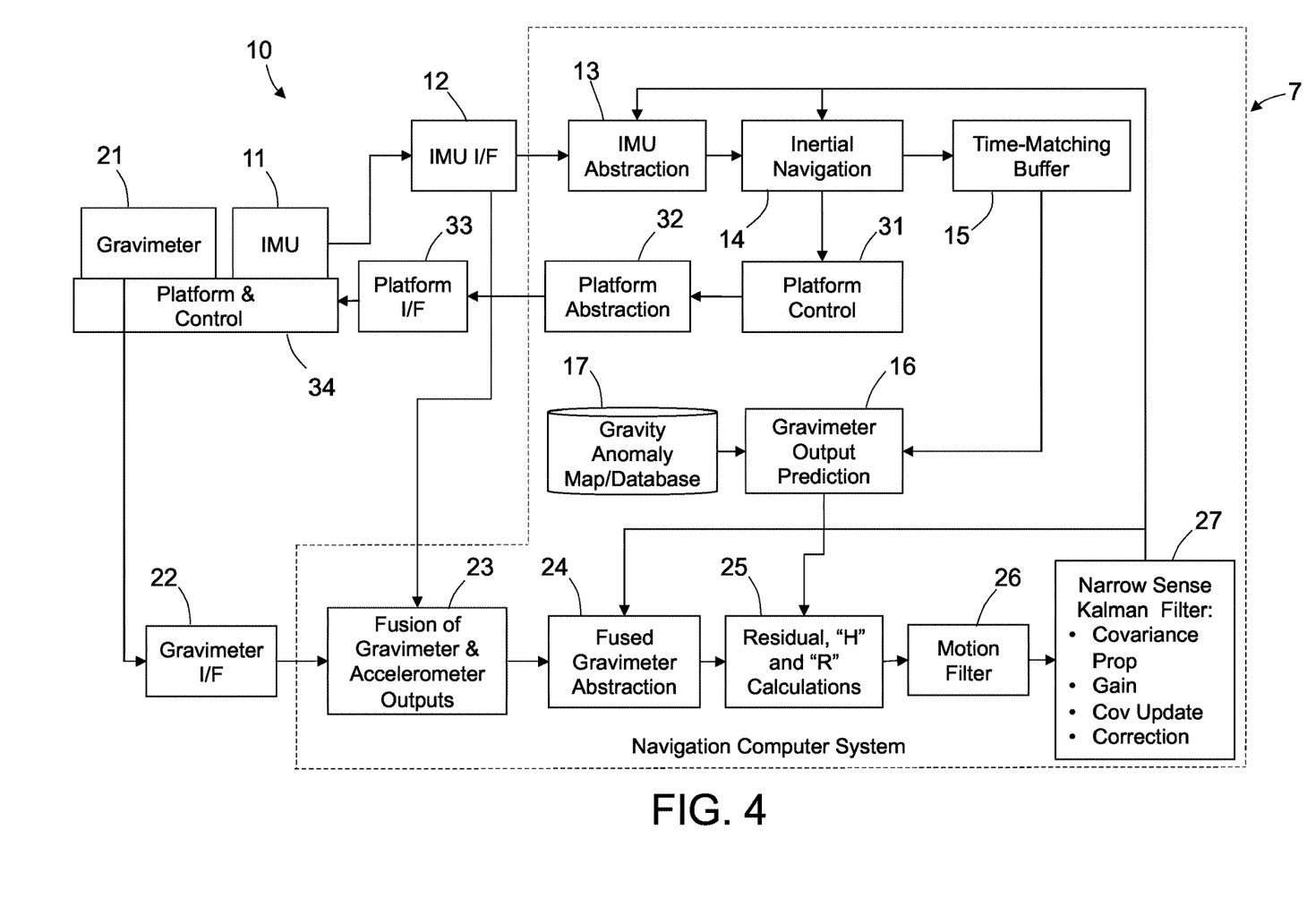
FIG. 4 is a diagram representing architecture for a system that uses gravity anomaly-based navigation to augment inertial navigation in accordance with an exemplary embodiment.

FIG. 4 is a diagram representing architecture for a navigation system 10 that uses gravity anomaly-based navigation to augment inertial navigation in accordance with an exemplary embodiment. Navigation system 10 is configured to determine a position of a platform 34 (e.g., an aircraft) in a frame of reference of Earth, such as the ECEF frame of reference. All of the data processing steps may be performed by respective modules configured to provide the below-described functionalities. Each module may include one or more processors programmed to execute instructions in accordance with respective software programs.

Navigation system 10 includes a navigation computer system 7, an inertial measurement unit 11 (hereinafter "IMU 11"), and a gravimeter 21 (or other gravity anomaly detector), all mounted to the platform 34. The navigation computer system 7 is in electronic communication with the IMU 11 by way of an IMU interface 12 and is in electronic communication with the gravimeter 21 by way of a gravimeter interface 22. The navigation computer system 7 is also in electronic communication with the motion control system onboard the platform 34 by way of a platform interface 33.

The navigation computer system 7 includes one or more devices selected from microprocessors, microcontrollers, digital signal processors, microcomputers, central processing units, application-specific integrated circuits, field-programmable gate arrays, programmable logic devices, state machines, logic circuits, analog circuits, and digital circuits. In the case of computer devices under software control, the computer device executes operational instructions that are stored in a non-transitory tangible computer-readable storage medium. In accordance with one embodiment, the navigation computer system 7 includes software modules that have code executable by respective processors for carrying out the functions and processes, as described herein.

In the example depicted in FIG. 4, the navigation computer system 7 includes an IMU abstraction module 13 connected to the IMU interface 12 and an inertial navigation module 14 connected to the IMU abstraction module 13, which implement inertial navigation. The navigation computer system 7 further includes a platform guidance and control module 31 connected to receive output from the inertial navigation module 14 and a platform abstraction module 32 connected to receive output from the platform guidance and control module 31 and send input to the platform interface 33. The platform guidance and control module 31 is configured to use the inertial navigation output to control the platform 34 so that the platform 34 is approximately level. (So the second-order error assumption is true).

The navigation computer system 7 also includes a time-matching buffer 15 connected to the inertial navigation module 14, a gravimeter output predictor 16 connected to the time-matching buffer 15, and a gravity anomaly map/database 17 (hereinafter "gravity anomaly map/database 17"). The gravimeter output predictor 16 is a module configured to use the time-matched states from the time-matching buffer 15 and gravity anomaly data from the gravity anomaly database 17 to predict what the output of the gravimeter 21 should be, consequently generating a "predicted sensor output".

The navigation computer system 7 further includes components that provide a gravity anomaly-aided navigation correction capability for correcting the inertial navigation results. The gravity anomaly-aided navigation correction subsystem includes a sensor data fusion module 23 connected to the IMU interface 12 and the gravimeter interface 22, a fused gravimeter abstraction module 24 connected to the sensor data fusion module 23, a residual and matrix calculation module 25 connected to the fused gravimeter abstraction module 24, a motion filter 26 connected to the residual and matrix calculation module 25, and an extended Kalman filter 27 connected to the motion filter 26.

The IMU 11 includes a first plurality of sensors for measuring the acceleration (e.g., three accelerometers having mutually orthogonal axes) and a second plurality of sensors for measuring the rotation rate (e.g., three gyroscopes having mutually orthogonal axes) of the platform 34. The IMU abstraction module 13 processes and encodes the signals output by the sensors of IMU 11 to form digital data representing measurements of the rotation rate (or delta angle) and acceleration (or delta velocity) of the platform 34. That rotation and acceleration data is processed by the inertial navigation module 14.

The IMU interface 12 is a combination of electrical hardware and software interfaces which enable the IMU data output by the IMU 11 to be provided to the navigation compute system 7. The IMU abstraction module 13 is a piece of software that transforms the IMU type/vendor-specific data into abstract, generic IMU data and interfaces. This module allows the inertial navigation module 14 to remain unchanged even if a different type of IMU is installed.

The inertial navigation module 14 is software that implements the classical "strapdown inertial navigation equations" (widely known in the art) which integrate the gyro data (rotation rate or delta angle) into attitude and transforms the accelerometer data (specific source or delta velocity) into a reference frame such as ECI, ECEF or local level frame. The transformed acceleration is then integrated into velocity and then into position. In one proposed implementation, the inertial navigation module 14 includes executable code to integrate the rotation rate of the platform 34 into the attitude of the platform 34 with consideration of the Earth's rotation. The platform attitude is then used to project platform acceleration onto the ECEF frame of reference. Accordingly, total platform acceleration, including gravity, due to Earth rotation can be calculated. Platform acceleration is then integrated into the velocity of the platform 34 and platform velocity is integrated to determine the position of the platform 34 in the ECEF frame of reference.

The time-matching buffer 15 stores a short history of the navigation states, including the attitude, velocity, position and possibly other relevant variables. Upon giving a time-tag a measurement, the corresponding state estimate will be calculated based on the data available in the buffer through interpolation. The time-matching buffer 15 includes executable code to store the position, velocity, attitude of the platform into a first-in first-out buffer or a circular buffer with a time tag. The time-matching buffer 15 provides the time-matched position, velocity, and attitude of the platform 34 when a time tag of the image-based measurements is provided. The time-matched position, velocity and attitude of the platform 34 are provided to the gravimeter output predictor 16.

The gravimeter output predictor 16 is a processor configured with software that processes the platform position/attitude data received from the time-matching buffer 15 and retrieves gravity anomaly data from the gravity anomaly database 17. As previously mentioned, the gravimeter output predictor 16 generates a prediction of what the output of the gravimeter 21 is expected to be. The gravity anomaly database 17 stores data representing the specific force as a function of position in the ECEF frame.

The gravimeter 21 measures the specific force along the vertical direction. The gravimeter 21 is placed on a platform 34 in a manner such that the z-axes of the IMU 11 and the gravimeter 21 are roughly aligned with the local vertical. The platform 34 does not need very good performance because any errors of the platform not being level only cause a second-order effect to the gravimeter measurement and the accelerometer along the vertical direction. The gravimeter interface 22 is electrical hardware and a software interface which allow the gravimeter data to be provided to the navigation computer system 7. The sensor data fusion module 23 performs the fusion of the measured accelerometer data for the local vertical direction with the gravimeter output as described above with reference to FIGS. 1-3. For example, the sensor data fusion module 23 may include subtracters 3 and 5, filter 4, and fault detector 6 as shown in FIG. 1, or subtracters 3, 3a, 5, and 5a, filters 4 and 4a, fault detectors 6 and 6a, and processing device 8 as shown in FIG. 3.

In the example depicted in FIG. 4, the navigation computer system 7 includes a fused gravimeter abstraction module 24 connected to the sensor data fusion module 23. The fused gravimeter abstraction module 24 is software that transforms the gravimeter type/vendor specific data into abstract, generic gravimeter data and interfaces. This module allows the downstream processing blocks to remain unchanged even if a different gravimeter is used.

The navigation computer system 7 further includes a residual and matrix calculation module 25 communicatively coupled to receive the measured specific force (fused solution) generated by the sensor data fusion module 23 and the predicted sensor output generated by the gravimeter output predictor 16. The residual and matrix calculation module 25 compares the predicated specific force against the measured specific force to calculate the Kalman filter residual. The residual r represents the difference between the predicted specific force and the measured specific force. The residual and matrix calculation module 25 also calculates a sensitivity matrix (H-matrix) and a measurement noise covariance matrix (R-matrix). The H-matrix is a matrix that maps a state to a measurement in a linearized error equation that indicates how error in the navigation solution and states in the Kalman filter 27 affect the predicted specific force. The R-matrix indicates a level of uncertainty or variances of the measurements collected by the accelerometers.

The residual and matrices pass through a motion filter 26 on their way to the Kalman filter 27. The motion filter 26 is a low-pass filter that filters out the specific force introduced by platform motion. Typically, the bandwidth of the filter is so low that what is left is gravity. Most of the motion-induced acceleration is filtered out.

The navigation computer system 7 includes a Kalman filter 27 that receives motion-filtered data representing the residuals and H- and R-matrices. The Kalman filter 27 is configured to generate position, velocity and attitude corrections based on the received residuals and matrices. In addition, the Kalman filter 27 estimates IMU corrections, such as bias, scale factor, misalignment corrections, which are sent to and applied by the IMU abstraction module 13. The Kalman filter-estimated position, velocity and attitude errors are sent to and applied by the inertial navigation module 14 to generate a navigation solution. In one proposed application, the navigation solution is sent to the platform guidance and control module 31 (e.g., a flight controller or autopilot in the case where the platform 34 is an aircraft), which is configured to control movement of the platform 34 based at least in part on the navigation solution received. The Kalman filter 27 maintains the covariance matrix of the states. The Kalman filter 27 is configured to use the H- and R-matrices to compute the gain, use the gain residual to generate corrections, and use the gain matrix, the R-matrix, and the current covariance matrix to calculate the covariance matrix after update. The Kalman filter 27 also outputs data to the fused gravimeter abstraction module 24 to correct gravimeter errors if needed.

In summary, the gravity anomaly-aided navigation system includes a gravimeter 21 that produces a time sequence of specific force measurements at different locations in the ECEF frame. Concurrently with operation of the gravity anomaly-aided navigation correction capability, the IMU 11 generates a time sequence of inertial navigation information (hereinafter "IMU data"). An inertial navigation algorithm (performed in inertial navigation module 14) is configured to analyze the IMU data to produce a time sequence of estimated inertial navigation solutions representing changing locations of the platform. That navigation solution is computed based in part on corrections derived by comparing the position determined by the gravity anomaly-based navigation system to the position determined by the inertial navigation system. The respective data from the inertial navigation system and the gravity anomaly-based navigation system are fused by the Kalman filter 27. The resulting navigation solution thus takes into account the corrections.

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

While sensor data fusion systems that measure specific force exerted on a moving platform in aid of navigation have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The embodiments disclosed above use one or more processing or computing devices. Such devices typically include a processor or controller, such as a general-purpose central processing unit, a microcontroller, a reduced instruction set computer processor, an application-specific integrated circuit, a programmable logic circuit, a field-programmable gate array, a digital signal processor, and/or any other data processing circuitry capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language or supporting description specifies conditions indicating a particular order in which some or all of those steps are performed. Nor should the method claims be construed to exclude any portions of two or more steps being performed concurrently or alternatingly unless the claim language or supporting description specifies a condition that precludes such an interpretation.

The invention claimed is:
1. A sensor data fusion system comprising:
a first accelerometer having low noise and high bias;
a second accelerometer having high noise and low bias;
a first subtracter connected to receive a signal from the first accelerometer and a signal from the second accelerometer and configured to output a first difference signal representing a difference between the signals from the first and second accelerometers;
a first filter connected to receive the first difference signal from the first subtracter and configured to output a signal representing an estimated relative bias of the first and second accelerometers;
a second subtracter connected to receive the signal from the first accelerometer and the signal from the first filter and configured to output a second difference signal representing a difference between the signals from the first accelerometer and the first filter;
a third accelerometer having low noise and high bias;
a third subtracter connected to receive signals from the second and third accelerometers and configured to output a third difference signal representing a difference between the signals from the second and third accelerometers;
a second filter connected to receive the third difference signal output by the third subtracter and configured to output a signal representing an estimated relative bias of the second and third accelerometers; and
a fourth subtracter connected to receive the signal from the third accelerometer and the signal from the second filter and configured to output a fourth difference signal representing a difference between the signals from the third accelerometer and second filter.

2. The sensor data fusion system as recited in claim 1, wherein the first filter is configured to filter out most noise while passing the signal representing the estimated relative bias.

3. The sensor data fusion system as recited in claim 2, wherein the first filter is a low-pass filter.

4. The sensor data fusion system as recited in claim 2, wherein the first filter is a Kalman filter.

5. The sensor data fusion system as recited in claim 1, further comprising a fault detector connected to receive the first difference signal and configured to output a fault true signal if the first difference signal persistently exceeds a specified difference threshold.

6. The sensor data fusion system as recited in claim 1, further comprising:
a first fault detector connected to receive the first difference signal and configured to output a fault true signal if the first difference signal persistently exceeds a specified difference threshold and a fault false signal otherwise;
a second fault detector connected to receive the third difference signal and configured to output a fault true signal if the third difference signal persistently exceeds the specified difference threshold and a fault false signal otherwise; and
a processing device connected to the first and second fault detectors and the third and fourth subtracters, wherein the processing device is configured to:
output the first difference signal if the first fault detector outputs a fault false signal while the second fault detector outputs a fault true signal; and
output the second difference signal if the first fault detector outputs a fault true signal while the second fault detector outputs a fault false signal.

7. The sensor data fusion system recited in claim 6, wherein the processing device is as further configured to output a weighted sum of the first and second difference signals if the first and second fault detectors output a respective fault false signal.

8. The sensor data fusion system as recited in claim 6, wherein the processing device is further configured to output a weighted sum of f the signals output by the first and third accelerometers with previously estimated bias if the first and second fault detectors output a respective fault true signal.

9. A method for fusing sensor data comprising:
using a first accelerometer having low noise and high bias to output a first measurement signal representing a first measurement of a specific force in a vertical direction in a frame of reference of a platform;
using a second accelerometer having high noise and low bias to output a second measurement signal representing a second measurement of the specific force in the vertical direction in the frame of reference of the platform;
generating a first difference signal representing a difference between the first and second measurement signals;
filtering the first difference signal to produce a first bias estimate signal representing an estimated relative bias of the first and second accelerometers;
generating a second difference signal representing a difference between the first measurement signal and the first bias estimate signal;
using a third accelerometer having low noise and high bias to output a third measurement signal representing a third measurement of the specific force in the vertical direction in the frame of reference of the platform;
generating a third difference signal representing a difference between the second and third measurement signals;
filtering the third difference signal to produce a second bias estimate signal representing an estimated relative bias of the second and third accelerometers; and
generating a fourth difference signal representing a difference between the third measurement signal and the second bias estimate signal.

10. The method as recited in claim 9, further comprising using the first difference signal in a navigation process if the first difference signal does not persistently exceed a specified difference threshold.

11. The method as recited in claim 9, further comprising generating a fault true signal if the first difference signal persistently exceeds a specified difference threshold.

12. The method as recited in claim 9, further comprising:
generating a fault true signal if the first difference signal persistently exceeds a specified difference threshold and a fault false signal otherwise;
generating a fault true signal if the third difference signal persistently exceeds the specified difference threshold and a fault false signal otherwise; and
using one of the first and second difference signals in a navigation process if the one of the first and second difference signals does not persistently exceed a specified difference threshold and the other of the first and second difference signals persistently exceeds the specified difference threshold.

13. A system for navigating a platform comprising:
an inertial navigation system configured to generate a navigation solution and comprising a first accelerometer having low noise and high bias;
a second accelerometer having high noise and low bias;
a guidance and control system communicatively coupled to the inertial navigation system and configured to control the platform in accordance with the navigation solution;
a sensor data fusion module configured to generate a bias estimate signal representing a relative bias estimate from outputs of the first and second accelerometers and then generate a signal that represents a corrected output of the first accelerometer derived by subtracting the bias estimate signal from the output of the first accelerometer;
a time-matching buffer communicatively coupled to the inertial navigation system and configured to store data representing position, velocity and attitude of the platform with a time-tag;
a gravity anomaly database stored in a non-transitory tangible computer-readable storage medium;
a gravimeter output predictor communicatively coupled to receive the time-tagged position, velocity, and attitude of the platform from the time-matching buffer and retrieve gravity anomaly data from the gravity anomaly database and configured to output a prediction signal representing a prediction of the output of the second accelerometer;
a residual and matrix calculation module communicatively coupled to receive the prediction signal and the corrected output of the first accelerometer and configured to generate a residual, an H-matrix, and an R-matrix based on a difference between the prediction signal and the corrected output of the first accelerometer; and
a Kalman filter configured to generate a position correction based on a difference between the prediction signal and the corrected output of the first accelerometer and then send the position correction to the inertial navigation system,
wherein the sensor data fusion module comprises:
a first subtracter connected to receive signals from the first and second accelerometers and configured to output a first difference signal representing a difference between the signals from the first and second accelerometers;
a first filter connected to receive the first difference signal output by the first subtracter and configured to output the bias estimate signal; and
a second subtracter connected to receive the signal from the first accelerometer and the bias estimate signal and configured to output a second difference signal representing a difference between the signal from the first accelerometer and the bias estimate signal.

14. The system as recited in claim 13, wherein the sensor data fusion module further comprises a fault detector connected to receive the first difference signal and configured to output a fault true signal if the first difference signal persistently exceeds a specified difference threshold.

15. The system recited in claim 13, wherein the sensor data fusion module further comprises:
a third accelerometer having low noise and high bias;
a third subtracter connected to receive signals from the second and third accelerometers and configured to output a third difference signal representing a difference between the signals from the second and third accelerometers;
a second filter connected to receive the third difference signal output the third subtracter and configured to output a signal representing an estimated relative bias of the second and third accelerometers; and
a fourth subtracter connected to receive the signal from the third accelerometer and the signal from the second filter and configured to output a fourth difference signal representing a difference between the signals from the third accelerometer and second filter.

16. The system recited in claim 15, wherein the sensor data fusion module further comprises:
a first fault detector connected to receive the first difference signal and configured to output a fault true signal if the first difference signal persistently exceeds a specified difference threshold and a fault false signal otherwise;
a second fault detector connected to receive the third difference signal and configured to output a fault true signal if the third difference signal persistently exceeds the specified difference threshold and a fault false signal otherwise; and
a processing device connected to the first and second fault detectors and the third and fourth subtracters, wherein the processing device is configured to:
output the first difference signal if the first fault detector outputs a fault false signal while the second fault detector outputs a fault true signal; and
output the second difference signal if the first fault detector outputs a fault true signal while the second fault detector outputs a fault false signal.

17. The system recited in claim 16, wherein the processing device is further configured to output a weighted sum of the first and second difference signals if the first and second fault detectors output a respective fault false signal.

18. The system recited in claim 16, wherein the processing device is further configured to output a weighted sum of the signals output by the first and second accelerometers with previously estimated bias if the first and second fault detectors output a respective fault true signal.

19. A method for navigating a platform comprising:
using a first accelerometer to output a first measurement signal representing a first measurement of a specific force in a vertical direction in a frame of reference of a platform;
generating an inertial navigation solution using the first measurement signal;
using a second accelerometer to output a second measurement signal representing a second measurement of the specific force in the vertical direction in the frame of reference of the platform;
generating a signal representing a measured specific force based on a difference between the first and second measurement signals;
generating a signal representing a predicted specific force using a history of navigation states and a gravity anomaly database;
generating an inertial navigation solution correction based on a difference between the predicted specific force and the measured specific force;
generating a corrected inertial navigation solution by applying the inertial navigation solution correction to the inertial navigation solution; and
controlling the platform in accordance with the corrected inertial navigation solution,
wherein the first accelerometer has low noise and high bias and the second accelerometer has high noise and low bias; and
wherein generating the signal representing the measured specific force based on the difference between the first and second measurement signals comprises:
generating a first difference signal representing a difference between the first and second measurement signals;
filtering the first difference signal to produce a bias estimate signal representing an estimated relative bias of the first and second accelerometers; and
generating a second difference signal representing a difference between the first measurement signal and the bias estimate signal.

20. The method as recited in claim 19, further comprising using the first difference signal in a navigation process if the first difference signal does not persistently exceed a specified difference threshold.

21. The method as recited in claim 19, further comprising generating a fault true signal if the first difference signal persistently exceeds a specified difference threshold.

* * * * *